(12) United States Patent
Chai

(10) Patent No.: US 11,368,106 B2
(45) Date of Patent: Jun. 21, 2022

(54) POWER CONVERTER PWM

(71) Applicant: Hamilton Sundstrand Corporation (HSC), Charlotte, NC (US)

(72) Inventor: Huazhen Chai, Calendonia, IL (US)

(73) Assignee: Hamilton Sundstrand Corporation (HSC), Charlotte, NC (US)

(*) Notice: Subject to any disclaimer, the term of this patent is extended or adjusted under 35 U.S.C. 154(b) by 99 days.

(21) Appl. No.: 16/823,676

(22) Filed: Mar. 19, 2020

(65) Prior Publication Data

US 2021/0297010 A1 Sep. 23, 2021

(51) Int. Cl.
*H02P 27/08* (2006.01)
*H02M 7/5387* (2007.01)
*H02M 1/12* (2006.01)

(52) U.S. Cl.
CPC ....... *H02M 7/53871* (2013.01); *H02M 1/126* (2013.01); *H02P 27/08* (2013.01)

(58) Field of Classification Search
CPC .... H02M 7/53871; H02M 1/126; H02P 27/08
See application file for complete search history.

(56) References Cited

U.S. PATENT DOCUMENTS

| | | | | |
|---|---|---|---|---|
| 4,843,534 A * | 6/1989 | Taddeo | ................. | H02M 7/497 363/134 |
| 4,904,919 A * | 2/1990 | McNaughton | .......... | H02P 27/08 318/798 |
| 5,657,217 A * | 8/1997 | Watanabe | ............. | H02M 7/493 363/71 |
| 6,605,928 B2 | 8/2003 | Gupta et al. | | |
| 6,801,441 B2 | 10/2004 | Salama | | |
| 7,218,072 B2 * | 5/2007 | Sugiura | ..................... | H02P 6/10 318/400.11 |
| 7,564,164 B2 * | 7/2009 | Yamamoto | .............. | G06F 1/206 310/317 |
| 7,808,125 B1 * | 10/2010 | Sachdeva | ................ | H02M 7/49 307/82 |
| 8,264,191 B1 | 9/2012 | Ranganathan et al. | | |

(Continued)

FOREIGN PATENT DOCUMENTS

| | | |
|---|---|---|
| CN | 108039815 A | 5/2018 |
| EP | 2408093 A2 | 1/2012 |

(Continued)

OTHER PUBLICATIONS

Extended European Search Report for European Patent Application No. EP21162945.6, dated Jul. 28, 2021.

*Primary Examiner* — Rina I Duda
(74) *Attorney, Agent, or Firm* — Locke Lord LLP; Scott D. Wofsy; Judy R. Naamat

(57) ABSTRACT

A pulse width modulator (PWM) of a multi-phase power converter is provided. The PWM includes a signal modulator that corresponds to each phase of the converter. Each signal modulator of the PWM is configured to receive a unique triangle carrier signal, receive a unique sine wave signal, compare the received triangle carrier signal and the received sine wave signal, and output at least one control signal based on a result of the comparison. The control signal controls an inverter that applies pulse width modulation to a DC power for converting the DC power to a multi-phase power, AC harmonics of the multi-phase power filtered by a common mode inductor.

17 Claims, 7 Drawing Sheets

(56) References Cited

U.S. PATENT DOCUMENTS

| | | | |
|---|---|---|---|
| 8,712,666 B2 | 4/2014 | Long et al. | |
| 2004/0066177 A1* | 4/2004 | Gupta | F02N 11/04 322/10 |
| 2004/0223348 A1* | 11/2004 | West | H02M 1/12 363/39 |
| 2005/0179419 A1 | 8/2005 | Ollila | |
| 2014/0015500 A1* | 1/2014 | Babazadeh | H02M 3/1584 323/272 |

FOREIGN PATENT DOCUMENTS

| | | |
|---|---|---|
| JP | S62171462 A | 7/1987 |
| KR | 20040057202 A | 7/2004 |

* cited by examiner

PWM Control Block Diagram

POWER CONVERTER PWM

BACKGROUND

1. Field of the Disclosure

The present disclosure relates to power converters and more particularly, to pulse width modulation controllers of a power converter or aerospace motor controller.

2. Description of Related Art

Power converters, including, for example motor controllers, have a filter that uses a common mode inductor. The filter is configured to reduce harmonics generated by switching that occurs within the power converter and to reduce EMI radiation. Ten-thirty percent of the size and weight of the power converter can be attributed to the common mode inductor.

Some options have been traditionally available to reduce the size and/or weight of the common mode inductor of the filter. In a first option, a higher switching frequency is used. This option increases switching losses and burdens a cooling system responsible for cooling the power converter. In a second option, The converter is provided with multilevel inverters or interleaved inverters, which complicates circuit topology and control of the converter, in addition to the for significantly more semiconductor switches. In a third option, the filter is an active filter or additional switching poles are provided to actively offset the harmonics generated by the converter's inverter. However, this option further complicates circuit topology and control of the converter, in addition to the for significantly more semiconductor switches.

While conventional methods and systems have generally been considered satisfactory for their intended purpose, there is still a need in the art for a system and method that can reduce the size and weight of the filter without increasing switching losses, burden on the cooling system, complexity of the circuit topology, complexity of control of the converter, or the number of switches.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a pulse width modulator (PWM) of a multi-phase power converter is provided. The PWM includes a signal modulator that corresponds to each phase of the converter. Each signal modulator of the PWM is configured to receive a unique triangle carrier signal, receive a unique sine wave signal, compare the received triangle carrier signal and the received sine wave signal, and output at least one control signal based on a result of the comparison. The control signal controls an inverter that applies pulse width modulation to a DC power for converting the DC power to a multi-phase power, AC harmonics of the multi-phase power being filtered by a common mode inductor.

In one or more embodiments, the PWM can further include a different triangle wave generator for each of the signal modulators, each triangle wave generator configured to generate one of the unique triangle carrier signals.

In one or more embodiments, the multi-phase convertor can have n phases, the triangle carrier signals can have the same cycle, and each of the triangle carrier signals can be shifted by 1/n of the cycle so that each triangle carrier signal is shifted relative to all of the other triangle carrier signals.

In one or more embodiments, the triangle carrier signals can be shifted by a forward rotational shift.

In one or more embodiments, the triangle carrier signals can be shifted by a backward rotational shift.

In accordance with another aspect of the disclosure, a multi-phase power converter is provided. The power converter includes an inverter configured to apply pulse width modulation to a DC power from a DC power source for converting the DC power to a multi-phase power and a filter configured to filter AC harmonics of the multi-phase power. The filter includes a common mode inductor for the multi-phase power. The power converter further includes a PWM controller having a signal modulator that corresponds to each phase of the multi-phase converter or controller. Each signal modulator of the PWM is configured to receive a unique triangle carrier signal, receive a unique sine wave signal, compare the received triangle carrier signal and the received sine wave signal, and output at least one control signal based on a result of the comparison, wherein the control signal controls pulse width modulation of the DC power.

In one or more embodiments, the PWM can further include a different triangle wave generator for each of the signal modulators, each triangle wave generator configured to generate one of the unique triangle carrier signals.

In one or more embodiments, the multi-phase power can have n phases, the triangle carrier signals have the same cycle, and each of the triangle carrier signals can be shifted by 1/n of the cycle so that each triangle carrier signal can be shifted relative to all of the other triangle carrier signals.

In one or more embodiments, the triangle carrier signals can be shifted by a forward rotational shift or a backward rotational shift.

In one or more embodiments, a core size of a core of each common mode inductor can be reduced by at least about 50% in at least one of size and weight relative to a configuration with a PWM in which all of the signal modulators are configured to receive the same triangle carrier signal.

In one or more embodiments, a core size of a core of each common mode inductor can be reduced by about 65% in at least one of size and weight relative to a configuration with a PWM in which all of the signal modulators are configured to receive the same triangle carrier signal.

In one or more embodiments, the filter can further include a differential inductor, wherein a size and weight of the differential inductor and a winding of the common mode inductor can be substantially unchanged relative to a configuration with a PWM in which all of the signal modulators are configured to receive the same triangle carrier signal.

In one or more embodiments, the PWM can be retrofitted to the convertor to replace a PWM that is configured for all of the signal modulators to receive the same triangle carrier signal.

In one or more embodiments, the filter can further include a differential inductor. A size and weight of the differential inductor can be substantially unchanged relative to a configuration with a PWM in which all of the signal modulators are configured to receive the same triangle carrier signal.

In accordance with one or more aspects of the disclosure, a method of controlling a pulse width modulation of a DC power converted into a multi-phase power. The method includes, for each phase power of the multi-phase power, receiving a unique triangle carrier signal, receiving a unique sine wave signal, comparing the received triangle carrier signal and the received sine wave signal, outputting at least one control signal based on a result of the comparison, and controlling by the control signal pulse width modulation of the DC power for converting the DC power to the multi-phase power, AC harmonics of the multi-phase power being filtered using common mode inductance.

In one or more embodiments, the method can further include generating the unique triangle carrier signals.

In one or more embodiments, the multi-phase power can have n phases, the triangle carrier signals can have the same cycle, and the method can further include shifting each of the triangle carrier signals by 1/n of the cycle so that each triangle carrier signal is shifted relative to all of the other triangle carrier signals.

In one or more embodiments of the disclosure, the method can further include replacing a component that was previously generating the same triangle carrier signal for each phase power that corresponds to each phase of the multi-phase with a component generating the unique triangle carrier signals.

In accordance with one or more embodiments of the disclosure, the method can further include reducing in at least one of size and weigh by at least about 50% a core size of a core of each common mode inductor filtering the multi-phase signal before it is provided to the motor relative to a configuration in which the same triangle carrier signal is received for each phase power.

In one or more embodiments, the method can further include maintaining substantially the same size and weight of a differential inductor and winding of a common mode inductor that filter the multi-phase power before it is provided to the motor relative to a configuration in which the same triangle carrier signal is received for each phase power.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
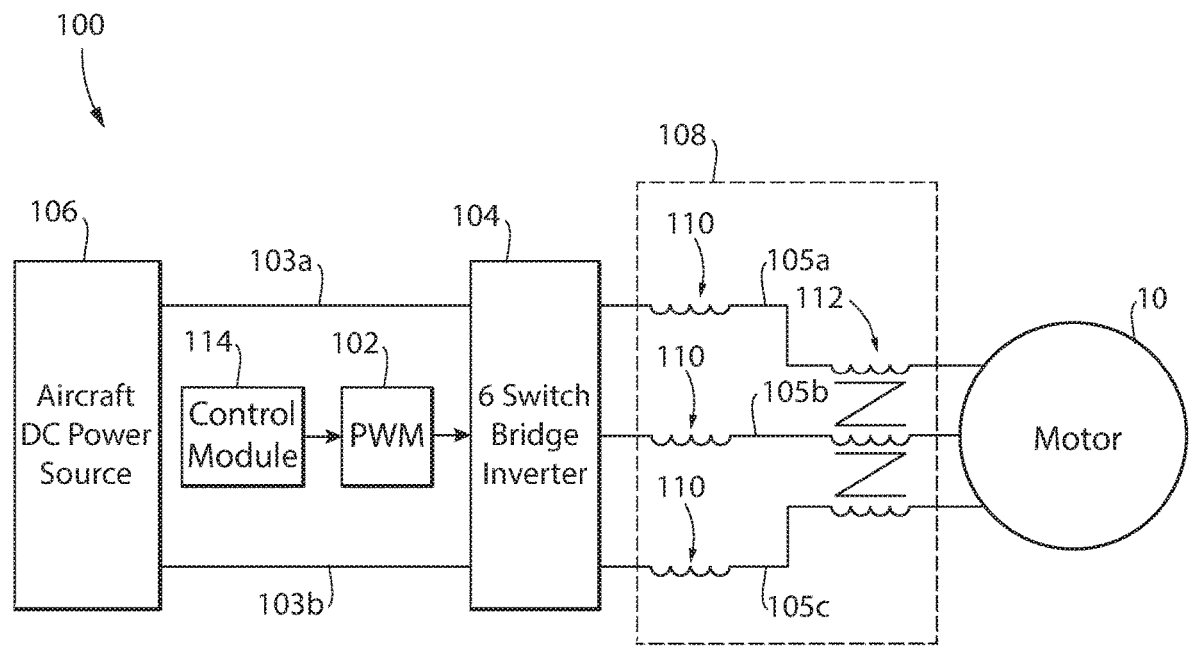
FIG. 1 shows a schematic diagram of an example power converter in accordance with one or more embodiments of the disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "the signal" includes reference to one or more signals and equivalents thereof known to those skilled in the art, and so forth.

Turning now descriptively to the drawings, in which similar reference characters denote similar elements throughout the several views, FIG. 1 depicts an exemplary power converter 100 in which below illustrated embodiments may be implemented. In the example, shown, the power converter is a controller for a motor 10 (e.g., an aerospace motor), however the disclosure is applicable to any power converter that includes an inverter with switches controlled by a pulse width modulator (PWM) and that includes a filter having at least one common mode inductor.

Power converter 100 includes an inverter 104 receiving a DC power via signal paths 103a and 103b from a DC power source 106. The converter 100 further includes a pulse width modulator (PWM) 102 and a control module 114. PWM 102 converts commands from control module 114 to switch logic that can control the switches of inverter 104. Control module 114 controls PWM 102.

Control module 114 can include a digital processing device, such as a microprocessor, digital signal processor (DSP), field programmable gate array (FPGA), application specific integrated circuit (ASIC), programmable integrated circuit (IC), for example. In one or more embodiments, PWM 102 can also be implemented digitally, such as by a digital processing device (e.g., a microprocessor, DSP, FPGA, ASIC, programmable IC. In one or more embodiments, PWM 102 can be integrated with control module 114. In one or more embodiments, PWM 102 can be implemented by hardware, such as by a digital or analog circuit.

Figure 2:
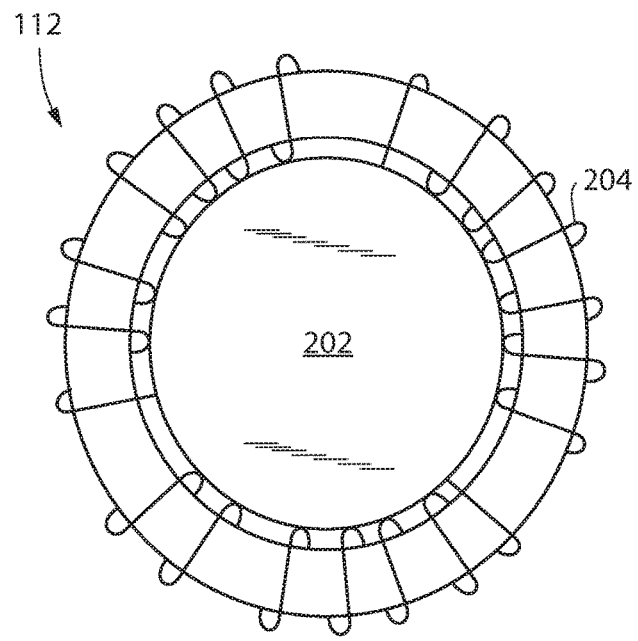
FIG. 2 shows a schematic diagram of a common mode (CM) inductor of a power converter, in accordance with one or more embodiments of the disclosure.

The inverter 104 modulates the DC power received from the DC power source and outputs a multi-phase power via phase paths 105a-105c, such as to a motor 10. Inverter 104 can include, for example and without limitation to a specific inverter topology, a six-switch inverter topology. Inverter 104 can include two levels or higher levels, although the benefit of this invention is most significant at lower levels. The converter 100 includes a filter 108 that includes a differential-mode (DM) inductor 110 disposed along each respective phase path 105a-105c, and a common-mode (CM) inductor 112 disposed along each respective phase path 105a-105c. In the example shown, the multi-phase power is a three-phase power, however the disclosure is not limited to a specific number of phases and is directed to two or more phases. With reference to FIG. 2, a schematic diagram of an example CM inductor 112 is shown. CM inductor 112 includes a magnetic core 202 and a winding 204 having coils that carry the corresponding phase of the multi-phase power output by inverter 104 and filtered by DM inductor 110. Winding 204 is formed of a highly conductive material, such as copper. The size and weight of the winding 204 needs to be sufficient to support phase currents, which are proportional to Vdiff, the differential voltage component measured at lines 105a, 105b, or 105c. Magnetic core 202 of the common mode inductor carries common mode flux and need to be sufficient to support Vcom, which is the common mode voltage component measured as one third of sum of three phase voltages at output terminals of inverter 104.

One skilled in the art will understand that the lower frequency voltage component f (e.g., f=1.0 per unit (pu) Hz) at contains more volt-second relative to higher frequency component. Accordingly, Vcom at or around 1.0 pu of switching frequency has the largest influence on core size of the CM inductor 112, whereas Vcom at higher harmonic values has a much smaller influence on the core size of the CM inductor 112.

Figure 3:
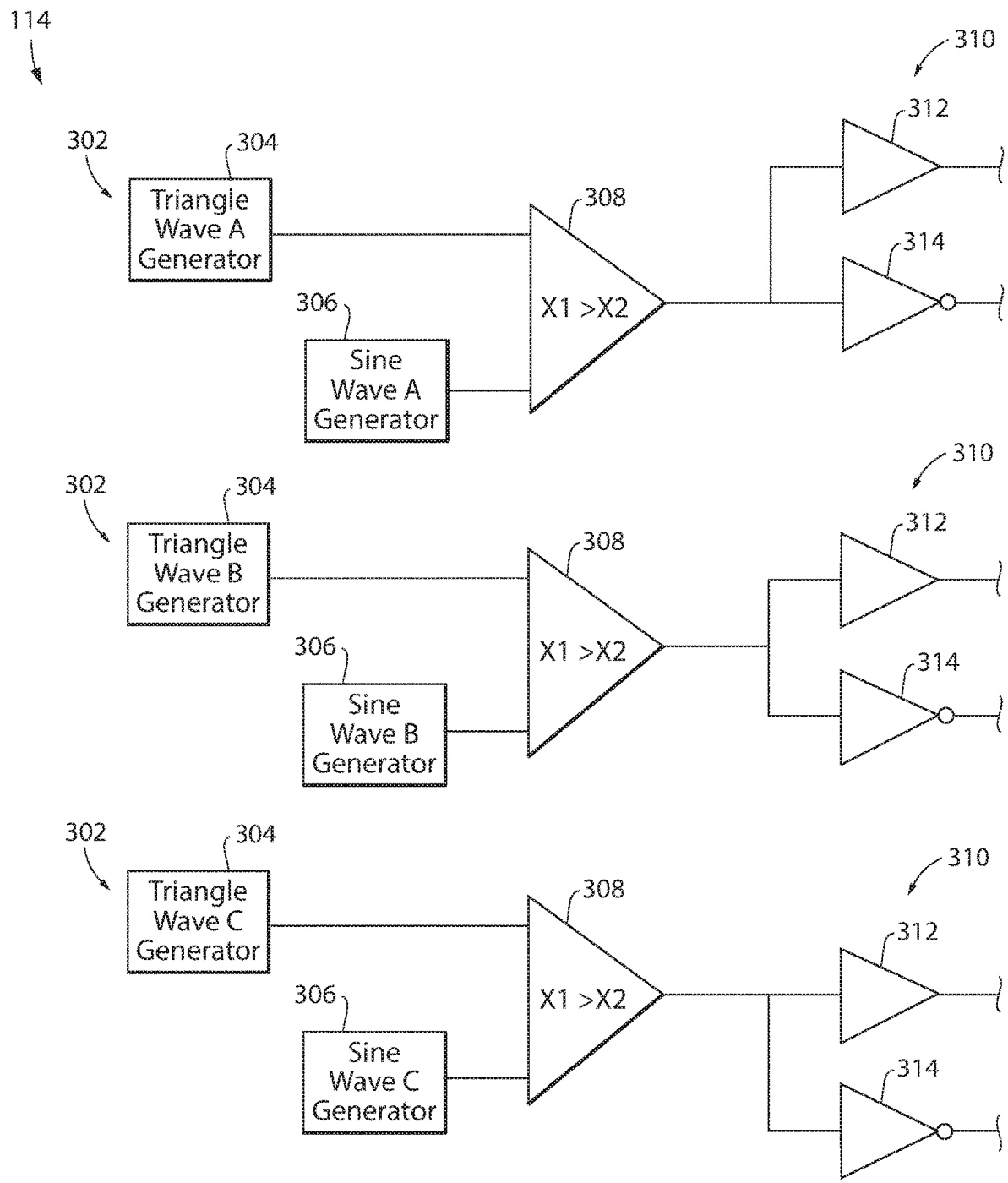
FIG. 3 shows a schematic diagram of a pulse width modulation (PWM) of a power converter, in accordance with one or more embodiments of the disclosure.

With reference to FIG. 3, a schematic diagram of an example control module 114 is shown. Control module 114 is configured to reduce the Vcom at 1.0 pu of switch frequency by providing a separate triangle carriers to modulate each of the phase power input to inverter 104 (as shown in FIG. 1). For n phase power, the triangle carrier is shifted by 1/n of the carrier cycle.

Control module 114 includes a different signal modulator for each respective phase of the multiphase power output by inverter 104. In the example shown, the multiphase power is a three-phase power, and three signal modulators 302 are provided, one for each phase. Each signal modulator 302 includes a triangle wave generator 304, a sine wave generator 306, a comparator 308, and an output buffer 310.

Triangle wave generator 304 generates a triangle carrier signal that is unique for the signal modulator 302 and phase to which it corresponds and provides the triangle carrier signal to comparator 308. Sine wave generator 306 generates a sine wave signal that is unique for the signal modulator 302 and phase to which it corresponds and provides the sine wave signal to comparator 308.

Comparator 308 receives and compares the triangle carrier signal and sine wave signal output by the corresponding triangle wave generator 304 and sine wave generator 306, respectively and outputs at least one control signal based on a result of the comparison. Output buffer 310 splits the three phase logic signals to six signals and buffers the control signal and outputs it to the six switches in inverter 104 (shown in FIG. 1) for converting the DC power to AC Power. Output buffer 310 can include a noninverting buffer and an inverting buffer. The output signals of each output buffer 310 is provided to a different switch in inverter 104.

Figure 4:
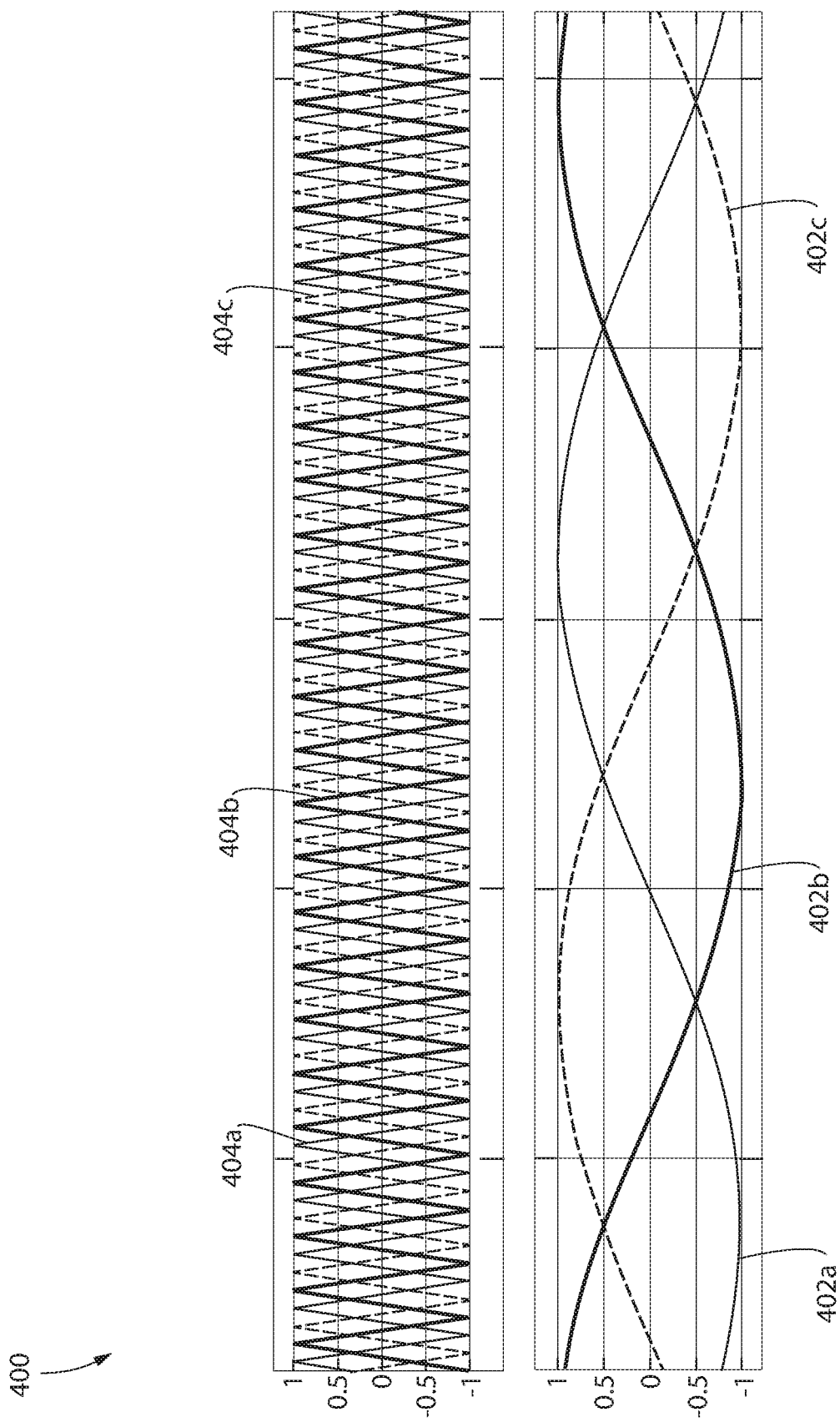
FIG. 4 shows a plot of example sine wave signals and triangle carrier signals generated for each of the signal modulator of a PWM controller, in accordance with one or more embodiments of the disclosure.

With reference to FIG. 4, an example plot 400 is shown of the sine wave signals and triangle carrier signals generated for each of the three signal modulators 302 that corresponds to a different phase of phase paths 105a, 105b, 105c. Sine wave signal 402a and triangle carrier signal 404a correspond to phase path 105a. Sine wave signal 402b and triangle carrier signal 404b correspond to phase path 105b. Sine wave signal 402c and triangle carrier signal 404c correspond to phase path 105c.

Figure 5:
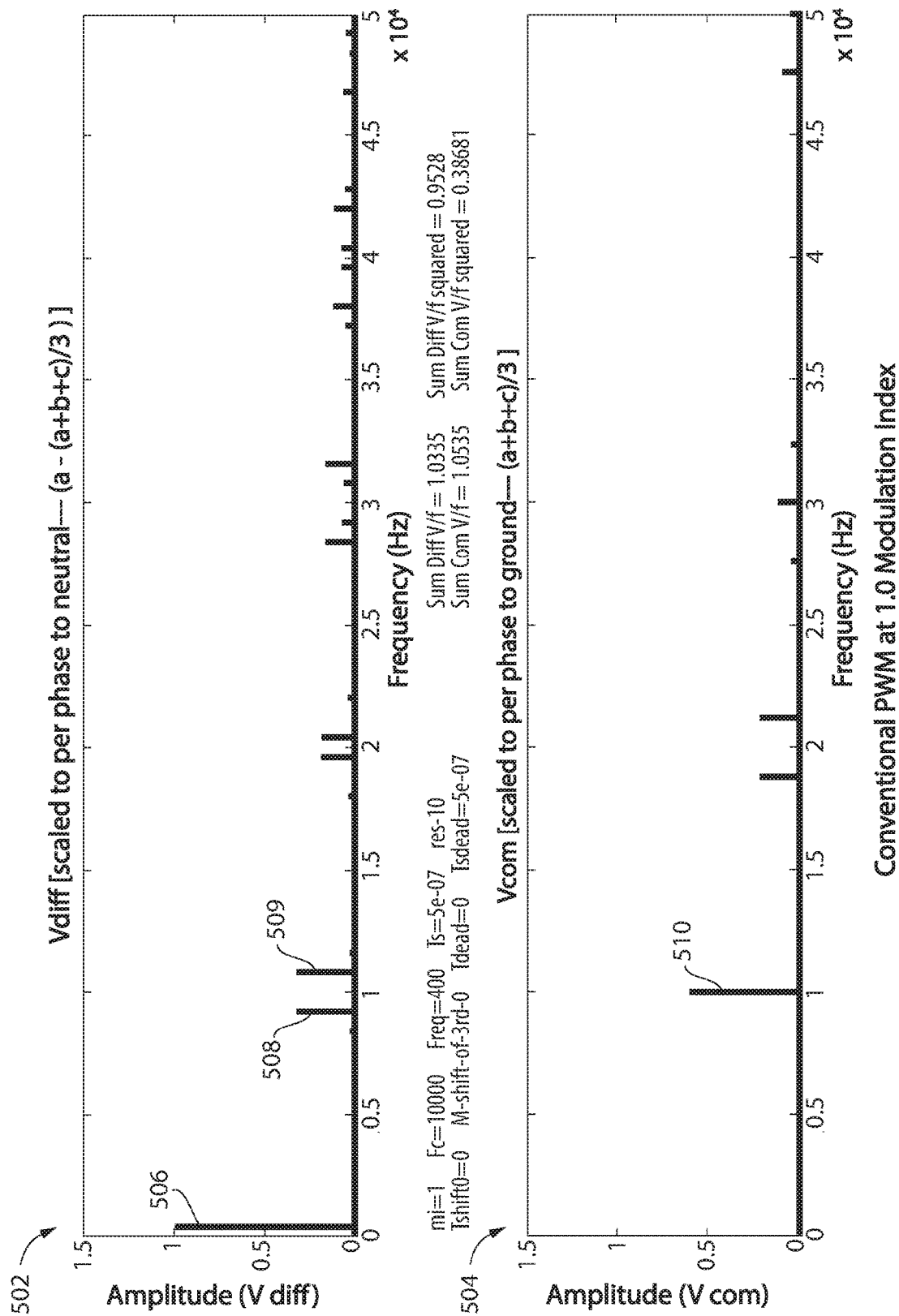
FIG. 5 shows example plots of spectra of a conventional sine-triangle PWM controlled inverter.

With reference to FIG. 5 example plots of spectra are shown for a conventional sine-triangle PWM controlled inverter having modulation index (MI)=1.0 (wherein 0<=MR=1.0). A differential mode plot 502 and a common mode plot 504 show Vdiff and Vcom measured over frequencies f showing the actual switching frequency at f=1.0 pu, and second harmonic at f=2.0 pu, and likewise increasing harmonics at f=3.0, 4.0, and 5.0 pu. Lowest frequency differential mode Vdiff 506=1.0 pu amplitude at f close to 0 pu governs size of winding 204 (shown in FIG. 2). The other differential mode components worth noting are Vdiff 508 and Vdiff 509 around f=1.0 pu. The lowest frequency common mode Vcom 510 governs size of core 202 (shown in FIG. 2). The magnitude of Vcom at frequencies that correspond to the higher harmonics (e.g., at f=2.0, 3.0, 4.0, or 5.0 pu as shown) have increasingly negligible effects on the size of core 202.

Figure 6:
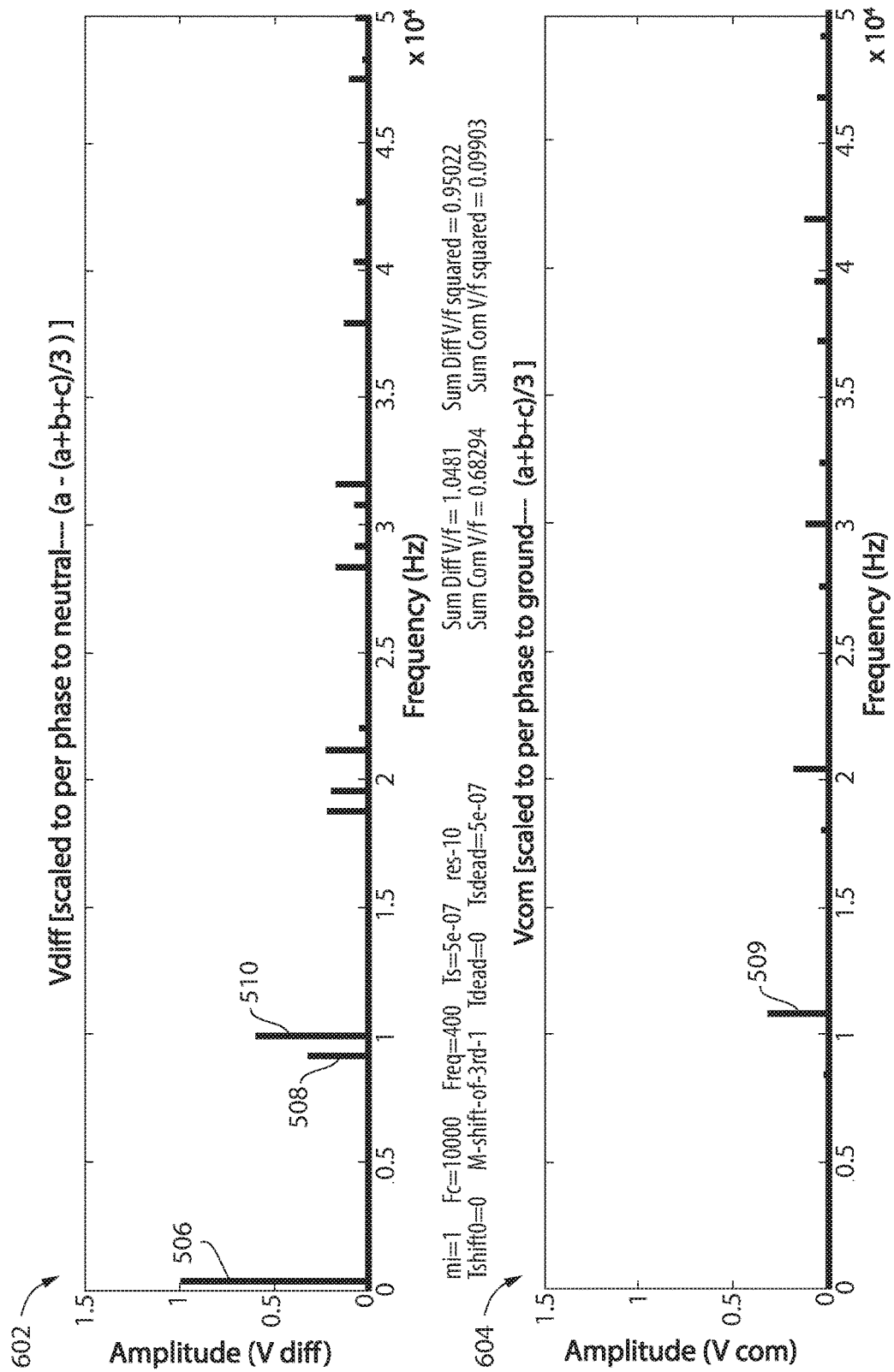
FIG. 6 shows example plots of spectra of a forward rotational carrier shifted PWM controlled inverter controlled using PWM shown in FIG. 3.

With reference to FIG. 6, example plots of spectra are shown for a forward rotational carrier shifted PWM controlled inverter, using PWM shown in FIG. 3, having modulation index (MI)=1.0. A differential mode plot 602 and a common mode plot 604, are similar to plots 502 and 504, except that forward rotational carrier shifted PWM control is used. As in plot 502, Vdiff 506=1.0 pu amplitude remains at f close to 0 pu. Spectral lines 509 and 510 have exchanged locations between top and bottom plots: spectral line 510 has now become differential mode and spectral line 509 has now become common mode. Their amplitude and frequency of spectral lines 508-510 remain the same. Spectral lines 509 Vcom in the disclosed PWM shown in FIG. 6, and 510 Vcom of the conventional PWM shown in FIG. 5, both at or close to (to the right of 1.0) f=1.0 pu, are compared, wherein spectral line 509 is reduced to less than 0.5 pu, which results in the common mode inductor core size 202 being reduced in size.

Figure 7:
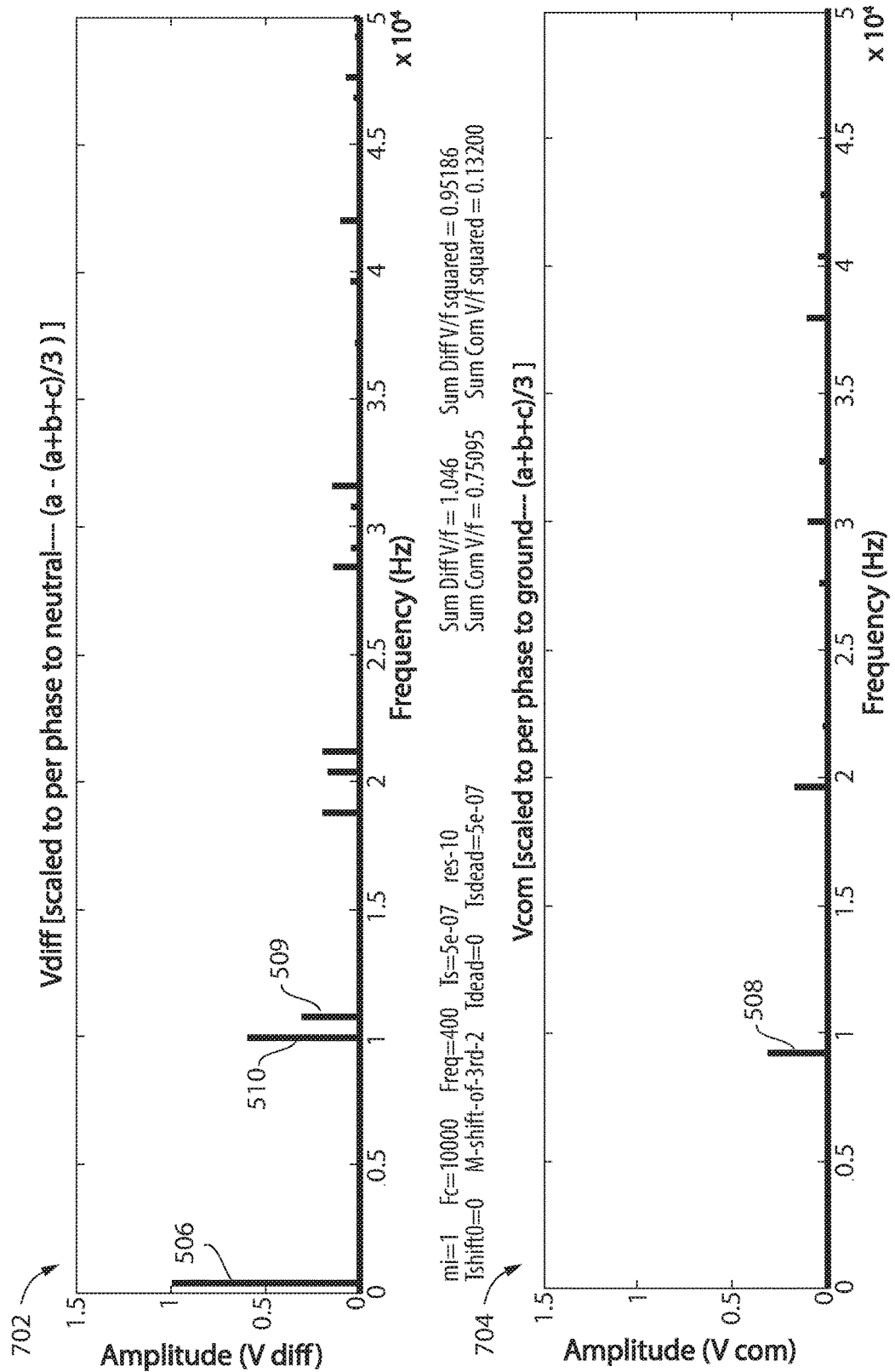
FIG. 7 shows example plots of spectra of a backward rotational carrier shifted PWM controlled inverter controlled using PWM shown in FIG. 3.

With reference to FIG. 7, plots of spectra are shown of a backward rotational carrier shifted PWM controlled inverter, using PWM shown in FIG. 3, having modulation index (MI)=1.0. A differential mode plot 702 and a common mode plot 704, are similar to plots 602 and 604, except that backward rotational carrier shifted PWM control is used. As in plots 502 and 602, Vdiff 506=1.0 pu at f close to 0 pu. Original spectral line 508 has been exchanged from being a differential component to becoming a common mode component. Original spectral line 510, which is greater than 0.5 has changed from common mode to differential mode, and spectral line, 508<0.5 has changed from differential mode to common mode, which results in the common mode inductor core size 202 being reduced in size as well.

FIGS. 5-7 demonstrate that when triangle carrier signals are generated for each of the three signal modulators 302 that corresponds to a different phase of phase paths 105a, 105b, 105c, for both forward rotation and backward rotation carrier shifts, common mode spectral line 510 is moved to differential mode. Also demonstrated is movement of one of the side band components of spectral lines 508 and 509 are moved from differential mode components to common mode components. In the forward rotational case shown in FIG. 6, spectral line 509 is moved to the plot for common mode. In the backward rotational case shown in FIG. 7, spectral line 508 is moved to the plot for common mode. Although spectral lines 508 and 509 have the same amplitude, spectral line 509 has a relatively higher frequency than spectral line 508. Accordingly, forward rotation may provide a higher benefit, since higher frequency corresponds to lower Volt-second, hence greater reduction in inductor core size. Of note is that Vdiff and Vcom at tripled multiples (f=3.0) of switching frequencies are substantially the same in FIGS. 5-7.

The reduction in inductor core size that can be achieved using carrier shifted PWM control is even larger for a modulation index=0.0. Experimental results and analysis have shown that a reshuffling of positions between Vdiff and Vcom occurs as shown in FIGS. 6 and 7, except that spectral lines 508 and 509 do not exist. The effect is that conventional PWM common mode 510 is shuffled to differential mode, but the newly shifted common mode spectral lines 508 or 509 are close to zero. Furthermore, when modulation index=0.0, conventional PWM control generates the highest magnitude of Vcom, and the disclosed carrier shifted PWM control generates the lowest magnitude Vcom (substantially equal to zero).

A qualitative determination of the reduction to common mode inductor core size and winding size achievable by the carrier shifted PWM control is described by Equations (1) and (2), respectively:

$$Cfe = \text{SUM}(V/f), \text{for harmonics 1 through 15} \quad \text{Equation (1)}$$

$$Ccu = \text{SUM}((V/f)^2), \text{for harmonics 1 through 15} \quad \text{Equation (2)},$$

wherein Cfe is a core size index, Ccu is a winding size index, V represents voltage spectrum magnitude, and f represents the frequency of each voltage spectrum component (represented as spectral lines).

When compared to conventional PWM control, with the same conditions, namely same switching frequency and conduction and switch losses of the semiconductor switches, the disclosed carrier shifted PWM control can potentially reduce the common mode inductor core size by more than 50%. Using carrier shifted PWM control, the inductor core size required to cover all modulation indices can be as low as only 45% of that relative to configurations using conventional PWM control. Furthermore, when using carrier shifted PWM control, any negative impact on differential inductor size and weight was determined to be hardly noticeable negative relative to configurations using conventional PWM control.

PWM 102 and control module 114 (as shown in FIG. 2) can be retrofitted to power converters (including motor controllers) that use conventional PWM control. Once retrofitted, no switching losses are incurred. The retrofit rather reduces the common mode inductor core flux density and reduces the common mode inductor core size in accordance with Equation (1).

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 8:
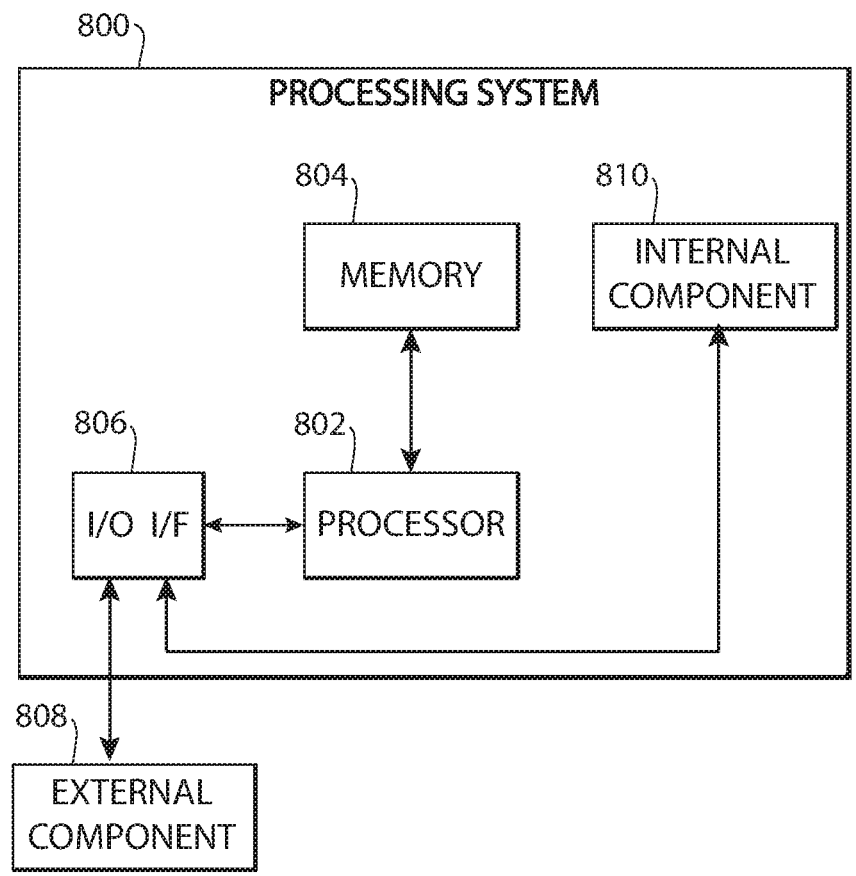
FIG. 8 shows a schematic block diagram of an example computing system, in accordance with an illustrative embodiment of the present disclosure.

With reference to FIG. 8, a block diagram of an example computing system 800 is shown, which provides an example configuration of control module 114. Computing system 800 is only one example of a suitable system and is not intended to suggest any limitation as to the scope of use or functionality of embodiments of the disclosure described herein. Computing system 800 can be implemented using hardware, software, and/or firmware. Regardless, computing system 800 is capable of being implemented and/or performing functionality as set forth in the disclosure.

Computing system 800 is shown in the form of a general-purpose computing device. Computing system 800 includes a processing device 802, memory 804, an input/output (I/O) interface (I/F) 806 that can communicate with an internal component 810, and optionally an external component 808.

The processing device 802 can include, for example, a programmable logic device (PLOD), microprocessor, digital signal processor (DSP), a microcontroller, a field programmable gate array (FPGA), an application specific integrated circuit (ASCI), and/or other discrete or integrated logic circuitry having similar processing capabilities.

The processing device 802 and the memory 804 can be included in components provided in the FPGA, ASCI, microcontroller, or microprocessor, for example. Memory 804 can include, for example, volatile and non-volatile memory for storing data temporarily or long term, and for storing programmable instructions executable by the processing device 802. I/O I/F 806 can include an interface and/or conductors to couple to the one or more internal components 808 and/or external components 810.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the controller 210 may be implemented or executed by one or more computer systems, such as a microprocessor. Each computer system 800 can implement controller 26, or multiple instances thereof. In various embodiments, computer system 800 may include one or more of a microprocessor, an FPGA, application specific integrated circuit (ASCI), microcontroller. The computer system 800 can be provided as an embedded device. All or portions of the computer system 800 can be provided externally, such by way of a mobile computing device, a smart phone, a desktop computer, a laptop, or the like.

Computer system 800 is only one example of a suitable system and is not intended to suggest any limitation as to the scope of use or functionality of embodiments of the disclosure described herein. Regardless, computer system 800 is capable of being implemented and/or performing any of the functionality set forth hereinabove.

Computer system 800 may be described in the general context of computer system-executable instructions, such as program modules, being executed by a computer system. Generally, program modules may include routines, programs, objects, components, logic, data structures, and so on that perform particular tasks or implement particular abstract data types.

One skilled in the art will appreciate further features and advantages of the illustrated embodiments based on the above-described embodiments. Accordingly, the illustrated embodiments are not to be limited by what has been particularly shown and described, except as indicated by the appended claims.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment(s) disclosed, but that the disclosure will include all embodiments falling within the scope of the appended claims.

What is claimed is:

1. A control module of a pulse width modulator (PWM) of a multi-phase power converter, the control module comprising a signal modulator that corresponds to each phase of multiple phases of the converter, each signal modulator of the control module comprising:
    a comparator, wherein the comparator is configured to:
        receive one triangle carrier signal that is unique relative to triangle carrier signals received for the other phases of the multiple phases, wherein the convertor has n phases, the triangle carrier signals have the same cycle, and each of the triangle carrier signals is caused to be unique by shifting the triangle carrier signal by 1/n of the cycle so that the triangle carrier signal for each phase is shifted relative to each of the triangle carrier signals for the other phases;
        receive a sine wave signal that is unique relative to sine wave signals received for the other phases of the multiple phases;
        compare the received triangle carrier signal and the received sine wave signal; and
        output at least one control signal based on a result of the comparison, wherein the control signal controls an inverter that applies pulse width modulation to a DC power for converting the DC power to a multi-phase power, AC harmonics of the multi-phase power being filtered by a common mode inductor.

2. The control module of claim 1, further comprising a different triangle wave generator for each of the signal modulators, each triangle wave generator configured to generate one of the unique triangle carrier signals.

3. The control module of claim 1, wherein the triangle carrier signals are shifted by a forward rotational shift.

4. The control module of claim 3, wherein the triangle carrier signals are shifted by a backward rotational shift.

5. A multi-phase power converter comprising:
    an inverter configured to apply pulse width modulation to a DC power from a DC power source for converting the DC power to a multi-phase power;
    a filter configured to filter AC harmonics of the multi-phase power, the filter having a common mode inductor for the multi-phase power; and
    a control module of a PWM having a signal modulator that corresponds to each phase of multiple phases of the converter, each signal modulator of the PWM configured to:
        receive one triangle carrier signal that is unique relative to triangle carrier signals received for the other phases of the multiple phases, wherein the convertor has n phases, the triangle carrier signals have the same cycle, and each of the triangle carrier signals is caused to be unique by shifting the triangle carrier signal by 1/n of the cycle so that the triangle carrier signal for each phase is shifted relative to each of the triangle carrier signals for the other phases;
        receive a sine wave signal that is unique relative to sine wave signals received for the other phases of the multiple phases;
        compare the received triangle carrier signal and the received sine wave signal; and
        output at least one control signal based on a result of the comparison, wherein the control signal controls pulse width modulation of the DC power.

6. The converter of claim 5, wherein the PWM further comprises a different triangle wave generator for each of the signal modulators, each triangle wave generator configured to generate one of the unique triangle carrier signals.

7. The converter of claim 5, wherein the triangle carrier signals are shifted by a forward rotational shift or a backward rotational shift.

8. The converter of claim 5, wherein a core size of a core of each common mode inductor is reduced by at least about 50% in at least one of size and weight relative to a configuration with a PWM in which all of the signal modulators are configured to receive the same triangle carrier signal.

9. The converter of claim 5, wherein a core size of a core of each common mode inductor is reduced by about 65% in at least one of size and weight relative to a configuration with a PWM in which all of the signal modulators are configured to receive the same triangle carrier signal.

10. The converter of claim 5, wherein the filter further includes a differential inductor, wherein a size and weight of the differential inductor and a winding of the common mode inductor are substantially unchanged relative to a configuration with a PWM in which all of the signal modulators are configured to receive the same triangle carrier signal.

11. The converter of claim 5, wherein PWM is retrofitted to the convertor to replace a PWM that is configured for all of the signal modulators to receive the same triangle carrier signal.

12. The converter of claim 5, wherein the filter further includes a differential inductor, wherein a size and weight of the differential inductor are substantially unchanged relative to a configuration with a PWM in which all of the signal modulators are configured to receive the same triangle carrier signal.

13. A method of controlling a pulse width modulation of a DC power converted into a multi-phase power, the method comprising:
    for each phase of multiple phases of the multi-phase power:
        receiving one triangle carrier signal that is unique relative to triangle carrier signals received for the other phases of the multiple phases, wherein the convertor has n phases, the triangle carrier signals have the same cycle, and each of the triangle carrier signals is caused to be unique by shifting the triangle carrier signal by 1/n of the cycle so that the triangle carrier signal for each phase is shifted relative to each of the triangle carrier signals for the other phases;

receiving a sine wave signal that is unique relative to sine wave signals received for the other phases of the multiple phases;

comparing the received triangle carrier signal and the received sine wave signal;

outputting at least one control signal based on a result of the comparison; and controlling by the control signal pulse width modulation of the DC power for converting the DC power to the multi-phase power, AC harmonics of the multiphase power being filtered using common mode inductance.

14. The method of claim 13, further comprising generating the unique triangle carrier signals.

15. The method of claim 13, further comprising replacing a component that was previously generating the same triangle carrier signal for each phase power that corresponds to each phase of the multi-phase power with a component generating the unique triangle carrier signals.

16. The method of claim 13, reducing in at least one of size and weigh by at least about 50% a core size of a core of each common mode inductor filtering the multi-phase power before it is provided to the motor relative to a configuration in which the same triangle carrier signal is received for each phase power.

17. The method of claim 13, maintaining substantially the same a size and weight of a differential inductor and a copper portion of a common mode inductor that filter the multi-phase power signal before it is provided to the motor relative to a configuration in which the same triangle carrier signal is received for each phase power.

* * * * *